Oct. 6, 1936.   P. E. GELDHOF   2,056,666
CLUTCH
Filed Nov. 3, 1933   2 Sheets-Sheet 2
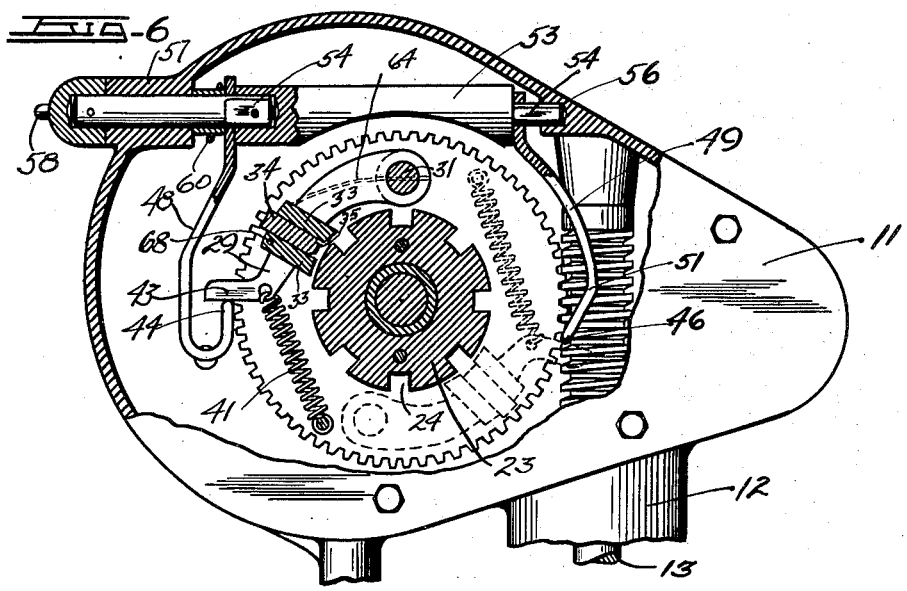
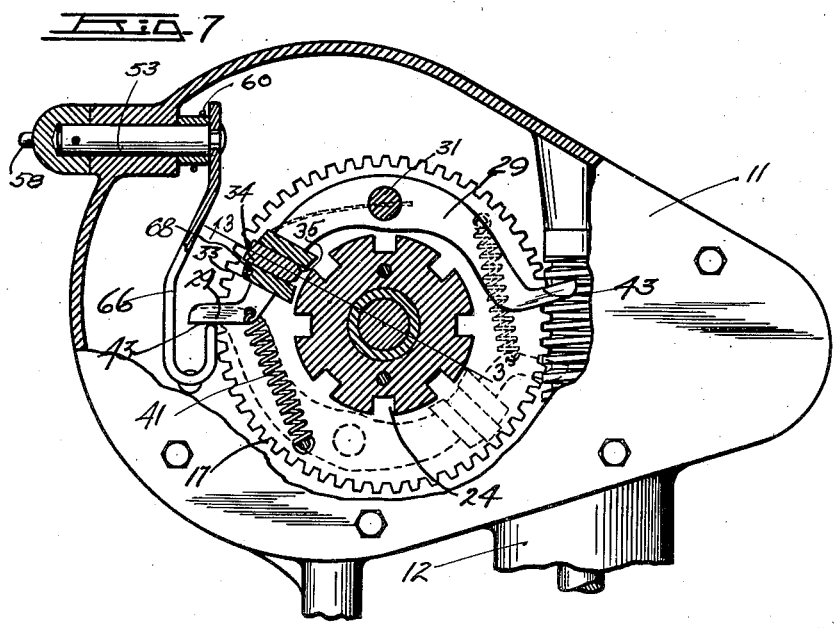
WITNESS
INVENTOR
BY
ATTORNEYS Patented Oct. 6, 1936

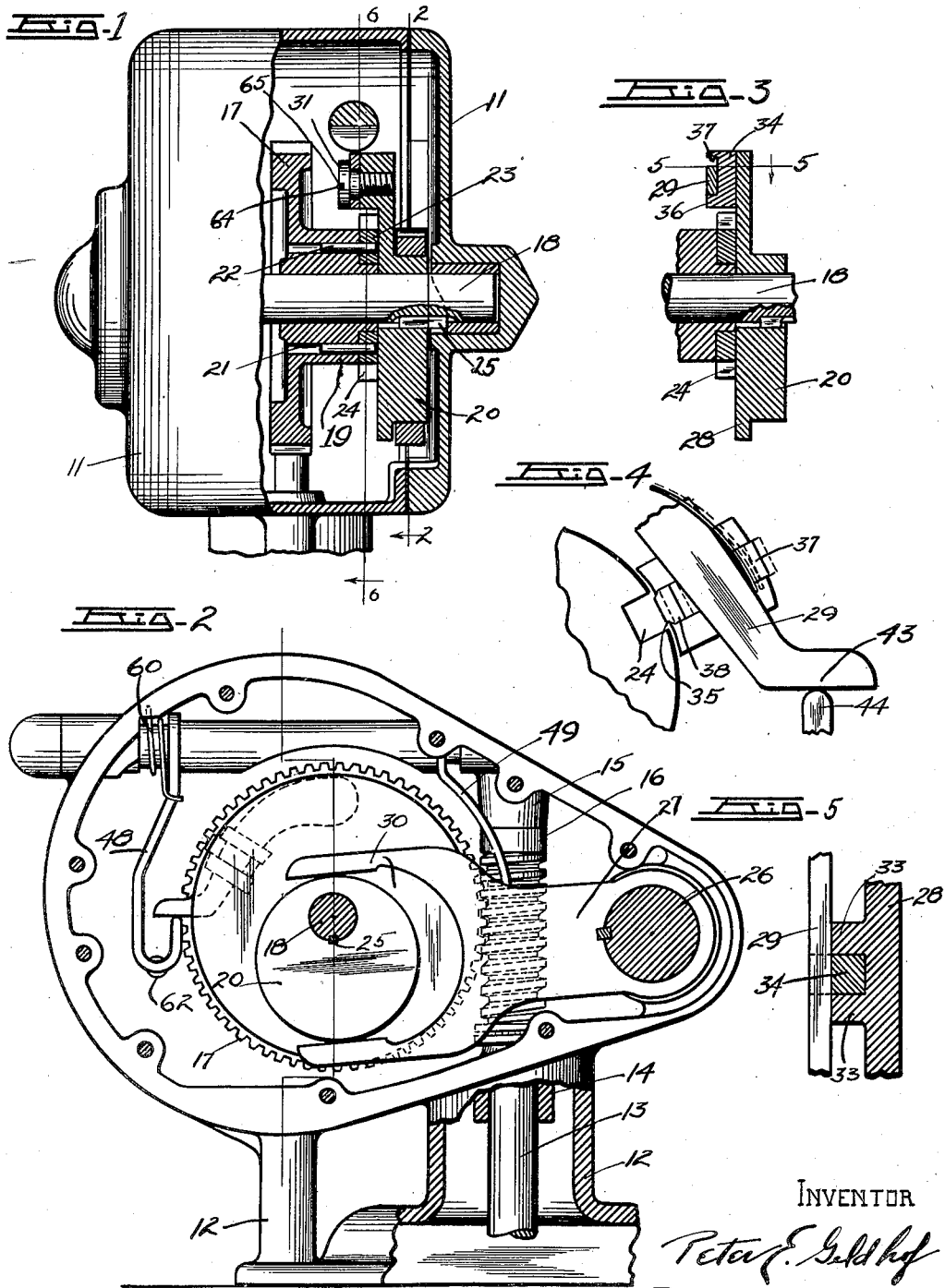

2,056,666

UNITED STATES PATENT OFFICE 2,056,666

CLUTCH

Peter Eduard Geldhof, Syracuse, N. Y., assignor to Easy Washing Machine Corporation, Syracuse, N. Y., a corporation of Delaware Application November 3, 1933, Serial No. 696,512

12 Claims. (Cl. 192—28)

My invention pertains in general to clutches and more specifically relates to a clutch particularly adapted for use in washing and ironing machines.

An object of my invention is the provision of a simple and efficient clutch mechanism for use particularly in washing and ironing machines in which the clutch parts are adapted to be automatically disengaged and reengaged with but slight physical effort.

My invention further contemplates the provision of a simply constructed clutch particularly adapted to finger-tip control in which the clutch elements are automatically disengaged after each 180° rotation and the clutch parts are automatically separated upon disengagement a distance sufficient to prevent ratcheting.

Other objects and advantages of my invention will be more apparent from the following description taken in connection with the accompanying drawings in which:—

Figure 1 is a view partially in section, showing my novel clutch mechanism mounted, for purposes of illustration, in the casing of an ironing machine.

Figure 2 is a view taken on the line 2—2 of Figure 1.

Figure 3 is a view taken on the line 3—3 of Figure 7.

Figure 4 is a detail view showing in solid lines the position of the driven clutch element immediately upon disengagement, and in dotted lines, its position subsequent to disengagement.

Figure 5 is a view taken on the line 5—5 of Figure 3.

Figure 6 is a view taken on the line 6—6 of Figure 1.

Figure 7 is a view similar to Figure 6, showing a modified structure of my novel clutch mechanism.

While my novel clutch mechanism is suitable for use in various kinds of machinery, it is particularly adapted for use in washing machines and ironing machines, and for purposes of illustration, is here shown and described in use in connection with the shoe-operating mechanism of an ironing machine. The ironing machine may be similar in construction to that illustrated and described in a copending application of Luther Ringer, Serial No. 418,256, filed Jan. 3, 1930.

In Figure 1, a casing 11 enclosing the operating mechanism for the roll and shoe of an ironing machine, is mounted in any suitable manner by means of a pedestal, generally indicated by the numeral 12 on an ironing stand or support not shown. A drive shaft 13, driven from any suitable source of power, is journaled in the casing at 14, projects upwardly into the casing and has a bearing 15 near the top thereof. Mounted thereon or preferably formed integrally therewith, is a worm 16 which meshes with a worm gear 17 loosely mounted on the main shaft 18 of the ironing machine. The roll of the ironing machine may be driven in any suitable manner from the worm gear 17, as in the manner described in the above-mentioned copending application. The worm gear 17 is formed with an enlarged hub 19 in which is formed a plurality of bores 21 for receiving pins 22 which are adapted to engage similar bores formed in a driving clutch element 23, although if desired, the driving clutch element 23 may be made integral with the worm gear 17. The driving clutch element 23 is formed with a plurality of teeth 24 and through the pins 22, is rotated continuously by the worm gear 17.

Fixed to the shaft 18 by means of a key 25 is an eccentric member 20 which is rotated through my novel clutch mechanism and is adapted to drive the main shaft 18. The eccentric 20 is arranged to oscillate a shoe-operating lever 27 having a pair of forked portions 30 adapted to receive the eccentric 20. Upon rotation of the eccentric continuously in one direction, the lever 27 is moved upwardly and downwardly to oscillate a shaft 26 keyed to the shoe-operating lever 27 through which shaft the shoe of the ironing machine is moved toward and away from the rotatable roll, as more particularly described in the above-mentioned copending application. Although the worm gear 17 has been described as being losely mounted on the shaft 18 and the eccentric 20 as fixed to the shaft, it will be, apparent that if desired, the driving clutch element 23 may be fixed to the shaft and the driven clutch element loosely mounted thereon.

As more clearly shown in Figure 3, the eccentric 20 is formed integrally with a circular plate 28 which supports, by means of a pivot screw 31 threaded into an aperture in the plate 28, a pivoted clutch arm 29 which is a part of the driven clutch element. Upon the face of the plate 28 is formed a pair of guides 33 adapted to receive slidably therein, a driven clutch tooth 34. The inner end of the sliding tooth is provided with a slight bevel indicated by the number 35. The driven clutch tooth, as shown more clearly in Figure 3, is a U-shaped member having projections or clutch arm contacts 36 and 37. The projecting portions 36 and 37 of the driven clutch tooth 34 are adapted to receive therebetween the clutch arm 29 and the projections are spaced apart a distance somewhat greater than the width of the clutch arm at the point of engagement so that the driven clutch tooth may be permitted a certain degree of movement with respect to the clutch arm.

A spring 41 having one end secured to the circular plate 28 and the other to the clutch arm 29, normally urges the arm and, therefore, the driven clutch tooth 34 in a direction such as to cause engagement of the driven clutch tooth with the teeth of the driving clutch element 23. The end of the clutch arm 29 projects outwardly and forms a stop 43 which, when engaged by either of a pair of stops 44 and 46 formed on a pair of trip fingers 48 and 49, retains the driven clutch tooth out of engagement against the tension of the spring 41. The end of the trip finger 48 is hook-shaped so as to engage the lower surface of the stop 43 on the end of the clutch arm 29, while the trip finger 49 is bent at 51 to bring it in correct position to engage the stop upon rotation of the driven clutch element from the solid line position, shown in Figure 6, to the dotted line position approximately 180° away, indicated in the same figure.

The trip fingers 48 and 49 are fixed through non-round connections to a shaft 53 which extends across the top of the casing in a position such as to bring the stops 44 and 46 on the trip fingers 48 and 49 normally in the path of rotation of the clutch arm 29. The shaft 53 is journaled at 56 on one side of the casing and on the opposite side extends through a bore 57 formed therein and projects outside of the casing. A finger-controlled arm 58 is secured to the projecting portion of the shaft 53 and enables control of the trip fingers 48 and 49 by the operator. A spring 60, one end of which is secured in the casing and the other end of which contacts with the trip finger 48, normally urges the fingers in such a position that the stops 44 and 46 are brought into the path of movement of the end of the clutch arm 29, a stop 62 being formed on the inside of the casing to limit the movement of the clutch fingers in this direction.

The trip fingers 48 and 49 may be withdrawn from the path of movement of the clutch arm 29 so as to release that arm and enable engagement of the clutch elements by manual movement of the control arm 58 in a direction against the tension of the spring 60. A spring 64 fitted in a groove 65 formed in the head of the pivot screw 31 engages the upper projection 37 on the clutch tooth 34 and normally urges the clutch tooth 34 in an upward direction, as shown more clearly in Figure 4. A pin 68 projecting outwardly and preferably located on one of the guides 33, limits the movement of the clutch arm 29 in a direction away from the driving clutch element.

In operation, upon rotation of the worm gear 16, the driving clutch element is continually rotated and normally, depending upon the position of the clutch arm 29, either one or the other of the stops 44 and 46 is in an effective position to engage the clutch arm 29 and retain the driven clutch tooth 34 out of engagement with the rotating driving clutch element. Upon manual movement of the control arm 58, the clutch arm 29 is released and the spring 41 draws the arm 29 inwardly and the arm, because of its engagement with the projection 36 on the driven clutch tooth 34, urges that member into engagement with one of the teeth of the driving clutch element 23. Immediately upon release of the control arm 58, the trip fingers 48 and 49 are restored by the spring 60 to their normal position in the path of movement of the clutch arm 29 so as to be in position to engage that arm upon substantially 180° rotation thereof. Engagement of the driven clutch tooth 34 with a tooth 24 of the driving clutch element connects the shoe-operating shaft 26 to the driving mechanism and either moves the shoe toward or away from the roll depending upon the position of the shoe.

Upon rotation of the clutch arm 29 to a position, for example, indicated by solid lines in Figure 6, the stop 43 on the end of the clutch arm 29 strikes the stop 44 and the clutch arm engages the upper projection 37 on the driven clutch tooth to disengage the clutch elements. The disengagement of the elements is aided by the continued rotation of the driving clutch element 23, the teeth of which tend to force the driven clutch tooth 34 out of engagement with a tooth 24 of the driving clutch element. Immediately upon disengagement, the spring 64, the tension of which has been increased during engagement, because of its contact with the upper projection 37, tends to throw the driven clutch tooth 34 upwardly into the position shown in Figure 3 and indicated in dotted lines in Figure 4. In this position the driven clutch tooth 34 is spaced from the driving clutch element and is held in a position such that it is clear of the teeth thereof whereby chattering or ratcheting is prevented.

In Figure 7 I have indicated a modified form of structure shown in Figure 6 in which the shaft 53 extends only part-way into the casing 11 and but a single trip finger 66 is employed. In this construction, the clutch arm 29 is formed with two stops 43, the clutch arm 29 extending substantially half-way around the driving clutch element on opposite sides of the pivot screw 31 so that upon each 180° rotation of the circular plate 28, either one or the other of the stops 43 will engage the clutch finger 66 whereby to cause disengagement of the clutch elements, as above described.

It will be apparent that various modifications in details and form of the structure of my invention may be made without departing from the scope of the invention as set forth in the appended claims.

I claim:

1. In combination, a pair of cooperable clutch elements, one of said clutch elements including a pivoted member and a tooth slidable with respect to said member, means for limiting the sliding movement of said tooth with respect to said member, a spring normally urging said slidable tooth into engagement with the other clutch element, stops on opposite ends of said member, and a clutch control member movable into the path of movement of said pivoted member for withdrawing said slidable tooth from engagement.

2. In combination, a pair of cooperable clutch elements, one of said clutch elements including a pivoted member and a tooth slidable with respect to said member, means for limiting the sliding movement of said tooth with respect to said member, a spring normally urging said slidable tooth into engagement with the other clutch element, stops on opposite ends of said member, a clutch control member, and a spring normally urging said clutch control member into the path of movement of said pivoted member for withdrawing said slidable tooth from engagement.

3. In combination, a toothed driving clutch element, a driven member, a driven clutch part pivotally mounted on said driven member, a tooth associated with and slidable with respect to said driven clutch part, means for limiting said sliding movement, a spring secured to said driven member and to said driven clutch part for normally urging said tooth into engagement with said toothed driving clutch element, a stop on said driven clutch part, and a pivoted member having a pair of arms alternately engageable with said stop after each 180° rotation thereof to withdraw said slidable tooth from engagement, and spring means normally urging said arms into the path of movement of said driven clutch part.

4. In combination, a toothed driving clutch element, a driven member, a driven clutch part pivotally mounted on said driven member, a tooth associated with and slidable with respect to said driven clutch part, means for limiting said sliding movement, a spring secured to said driven member and to said driven clutch part for normally urging said tooth into engagement with said toothed driving clutch element, a stop on said driven clutch part and a pivoted member having a pair of arms alternately engageable with said stop after each 180° rotation thereof to withdraw said slidable tooth from engagement, and a spring engaging said slidable tooth to throw said tooth clear of the teeth of said driving clutch element upon disengagement.

5. In combination, a driving clutch element having a plurality of radially extending teeth, a driven member, a clutch element pivotally mounted on said driven member, said driven clutch element including a clutch tooth slidable radially with respect to the driving clutch element, a spring secured to said driven member and to said driven clutch element for normally urging said slidable clutch tooth into engagement with said driven clutch element, and a spring engaging said slidable tooth for moving said slidable tooth clear of the teeth of said driving clutch element when the clutch elements are disengaged.

6. In combination with a driving clutch element having radially projecting teeth, a member mounted adjacent said element, a driven clutch element pivotally mounted on said member, said driven clutch element including a floating tooth slidable radially with respect to the driving clutch element, and means normally urging said slidable tooth radially into engagement with said driving clutch element.

7. In combination, a pair of cooperable clutch elements, one of said clutch elements having radially projecting teeth and the other of said clutch elements including a slidable tooth and a member with respect to which said tooth is slidable, spring means normally urging said slidable tooth into engagement with the other clutch element, means engageable with said member for withdrawing said tooth from engagement with said other clutch element, and spring means engaging said slidable tooth for moving it clear of said other clutch element when the clutch elements are disengaged.

8. In combination, a driving clutch element having radial teeth, a driven member, a driven clutch part pivotally mounted on said driven member, a clutch tooth slidable with respect to said driven clutch part, means for limiting said sliding movement, a spring secured to said driven member and to said driven clutch part for normally urging said clutch tooth into engagement with said driving clutch element, a stop on said driven clutch part, a pivoted member having a pair of arms alternately engageable with said stop after each 180 degree rotation thereof to withdraw said slidable tooth from engagement, spring means normally urging said arms into the path of movement of said driven clutch part, and a spring engaging said clutch tooth for moving said clutch tooth clear of the teeth of said driving clutch element upon its disengagement.

9. In combination, a pair of cooperable clutch elements, one of said clutch elements including a pivoted member and a tooth slidable with respect to said member, means for limiting the sliding movement of said tooth with respect to said member, a spring normally urging said slidable tooth into engagement with the other clutch element, stop means on said pivoted member, and means comprising a clutch control member movable into the path of movement of said pivoted member for withdrawing said slidable tooth from engagement upon each 180 degree rotation thereof.

10. In combination, a driving clutch element having radially projecting teeth, a driven member having a pair of guideways thereon in substantially radial alignment with the clutch teeth of said driving clutch element, a driving clutch arm pivotally mounted on said driven member, a clutch tooth slidable in said guideways, a projection on said tooth engageable by said arm for urging said clutch tooth into engagement with said driving clutch element, a spring normally urging said arm to rotate about its pivot to force said clutch tooth into engagement with said driving clutch element, and a spring engaging said tool for moving said tooth clear of the teeth of said driving clutch element when the clutch elements are disengaged.

11. In combination, a toothed driving clutch element, a driven member, a driven clutch part pivotally mounted on said driven member and rotatable therewith, a slidable tooth having a projection thereon, means normally urging said driven clutch part in a direction such that it engages said projection to throw said slidable tooth into engagement with said driving clutch element, means for disengaging said slidable tooth from said driving clutch element, and a spring normally acting in a direction to withdraw said slidable tooth from engagement and acting to throw said slidable tooth clear of the teeth of said driving clutch element upon disengagement to prevent ratcheting.

12. In combination, a driving clutch element having radially extending teeth, a driven member, a driven clutch part pivotally mounted on said member, a clutch tooth carried by said driven clutch part and having limited movement with respect thereto, said clutch tooth being movable radially into engagement with the radial teeth of said driving clutch element, a spring secured to said driven member and to said driven clutch part for normally urging the driven clutch part in a direction such that said clutch tooth engages the teeth of the driving clutch element, a pair of stops on opposite ends of said driven clutch part, and a member movable into and out of the path of movement of said stops for engaging said stops at each 180 degree rotation of the driven clutch part to withdraw the clutch tooth from engagement with the teeth of the driving clutch element.

PETER EDUARD GELDHOF.